2,916,501

TETRAHYDROPYRANS

Dale N. Robertson, Midland, Mich., assignor to The Dow Chemical Company, Midland, Mich., a corporation of Delaware No Drawing. Application February 3, 1958
Serial No. 712,655

6 Claims. (Cl. 260—345.9)

The present invention relates to new compounds characterized by the formula

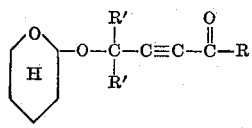

wherein R is lower alkyl, and wherein each R' is an independently selected member of the group consisting of phenyl, alkyl and cycloalkyl, provided not more than one of the R's is a cyclic radical, and wherein the two R's may form with the carbon atom of attachment a cycloalkyl radical. The expression "lower alkyl" is used in the present specification and claims to refer to those alkyl radicals having from 1 to 4 carbon atoms, inclusive, and the expression "cycloalkyl" to refer to those cyclic aliphatic radicals having from 5 to 6 carbon atoms, inclusive. The new compounds are useful as active toxic constituents of compositions employed for the control of many bothersome pests, such as bacteria and fungi. Further, the new compounds are useful as intermediates for making gamma-hydroxy-alpha, beta-acetylenic ketones of my copending application Serial No. 712,653.

The compounds of the present invention may be prepared by reacting the alkali metal or Grignard derivative of a 2-(tertiary alkynyloxy-tetrahydropyran (prepared in accordance with my copending application, Serial No. 712,654, filed even date herewith) with an alkanoic anhydride in the presence of an inert atmosphere and an inert solvent. The alkali metal or Grignard derivatives may be prepared in conventional manner by reaction of the 2-(tertiary alkynyloxy)-tetrahydropyran with metallic sodium, lithium or an alkyl metallic halide (Grignard reagent). The reaction of the Grignard reagent with the acid anhydride proceeds smoothly at temperatures below about minus 30° C. This temperature condition is readily achieved by employing an acetone-Dry Ice bath. Good results are obtained when employing substantially equimolar proportions of the metallo organic compound and from a three to a six molar excess of the alkanoic anhydride.

In one manner of carrying out the present invention to obtain the new compounds the acetylenic metallo tetrahydropyran, dissolved or dispersed in an inert reaction solvent such as tetrahydrofuran, is cooled to between —30° and —80° C. and the appropriate alkanoic anhydride added over a one to three-hour period. This latter addition is carried out under an inert atmosphere to insure minimal side reaction. Upon completion of the reaction, the mixture is removed from the cooling bath and upon warming to zero degrees, is poured over crushed ice, stirred for one-half hour, the water separated, the organic layer washed with ice water, then washed with a saturated sodium chloride solution and dried. The resulting organic layer may be fractionally distilled to obtain the desired product, a gamma-tetrahydropyranyloxy-α,β-acetylenic ketone in a substantially pure state.

The following examples are illustrative of the present invention but are not to be construed as limiting.

Example 1

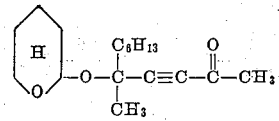

A Grignard reagent was prepared from 7.3 grams (0.3 mole) of magnesium and 33 grams (0.3 mole) of ethyl bromide in 200 ml. of tetrahydrofuran and 71.7 grams of 2-(3-methyl-1-nonyn-3-yloxy)tetrahydropyran dissolved in 110 ml. of tetrahydrofuran was added thereto over a one-hour period. During the addition, a gas was evolved. The temperature was maintained at between about 20° and about 55° C. Upon completion of the addition, the mixture was heated at reflux for an additional one-half-hour period to insure completion of the reaction. Thereafter the mixture was cooled in an acetone-Dry Ice bath and 102 grams (1.0 mole) of acetic anhydride added over a one-hour period. This latter addition was carried out under an inert atmosphere of nitrogen to insure minimal side reactions. Upon completion of the reaction, the mixture was removed from the Dry Ice-acetone bath and upon warming to near zero degrees, the reaction mixture was poured over crushed ice, stirred for one-half hour, the water separated, the organic layer washed first with ice water, then with a saturated sodium chloride solution and finally dried over anhydrous magnesium sulfate. The resulting organic layer was fractionally distilled under reduced pressure to obtain a 5-methyl-5-(tetrahydro-2-pyranyloxy)-3-undecyn-2-one product boiling at 115°–119° C. at 0.06 mm. pressure.

Example 2

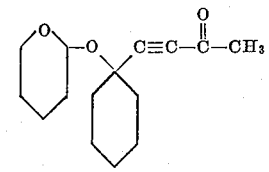

In the manner of the foregoing example employing 2-(1-ethynylcyclohexyloxy)tetrahydropyran in place of 2-(3-methyl-1-nonyn-3-yloxy)tetrahydropyran there was obtained a 4-[-(tetrahydro-2-pyranyloxy)-cyclohexyl]-3-butyn-2-one product boiling at 100°–102° C. at 0.15 mm. pressure.

Example 3

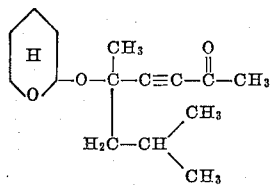

In the manner of Example 1, employing 2-(3,5-dimethyl-1-hexyn-3-yloxy)tetrahydropyran in place of 2-(3-methyl-1-nonyn-3-yloxy)tetrahydropyran there was obtained a 5,7-dimethyl-5-(tetrahydro-2-pyranyloxy)-3-octyn-2-one product boiling at 83°–86° C. at 0.04 mm. pressure.

Example 4

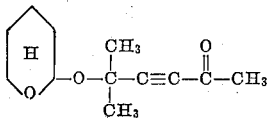

In the manner of Example 1 employing 2-(3-methyl-1-butyn-3-yloxy)tetrahydropyran in place of 2-(3-methyl-1-nonyn-3-yloxy)tetrahydropyran there was obtained a 5-methyl - 5-(tetrahydro - 2-pyranyloxy) - 3-hexyn-2 - one product boiling at 83°–84° C. at 0.06 mm. pressure.

*Example 5*

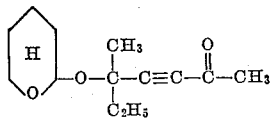

In the manner of Example 1, employing 2-(3-methyl-1-pentyn-3-yloxy)tetrahydropyran in place of 2-(3-methyl-1-nonyn-3-yloxy)tetrahydropyran there was obtained a 5-methyl - 5-(tetrahydro - 2-pyranyloxy)-3 - heptyn-2-one product boiling at 69°–72° C. at 0.01 mm. pressure.

In a like manner, other gamma-tetrahydropyranyloxy-α,β-acetylenic ketones may be prepared. Thus, for example, 5-phenyl-5-(tetrahydro-2-pyranyloxy)-3-hexyn-2-one may be prepared by reacting 2-(3-phenyl-1-butyn-3-yloxy)tetrahydropyran with ethyl magnesium bromide and then with acetic anhydride; 7-cyclohexyl-(tetrahydro-2-pyranyloxy)-5-nonyn-4-one by reacting 2-(3-cyclohexyl-1-pentyn-3-yloxy)tetrahydropyran with ethyl magnesium bromide and then with butyric anhydride; and 5-ethyl-5-(tetrahydro-2-pyranyloxy)-3-nonyn-2-one by reacting 2-(3-ethyl-1-heptyn - 3 - yloxy)tetrahydropyran with ethyl magnesium bromide and then with acetic anhydride.

The compounds of the present invention have been tested and found to be effective as toxic ingredients of compositions used for the control of bacterial or fungal organisms. In representative operations, 0.05 percent by weight of one of the following compounds, 5-methyl-5-(tetrahydro-2-pyranyloxy)-2-heptyn-2-one, 5,7-dimethyl-5-(tetrahydro-2-pyranyloxy)-3-octyn-2-one, and 5-methyl-5-(tetrahydro-2-pyranyloxy)-3-hexyn-2-one, gave 100 percent control of *Staphylococcus aureus, Aspergillus terreus, Penicillium digitatum* and *Rhizopus nigricans*.

I claim:

1. Gamma-tetrahydropyranloxy - alpha, beta-acetylenic ketones having the formula

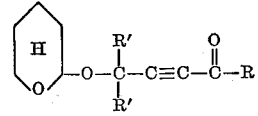

wherein R represents lower alkyl, each R' represents an independently selected member of the group consisting of phenyl, lower alkyl and cycloalkyl radicals, said cycloalkyl radical having from 5 to 6 carbon atoms and wherein the two R's may form with the carbon atom of attachment a cycloalkyl ring having from 5 to 6 carbon atoms and wherein not more than one of the R' is a cyclic radical.

2. 5-methyl - 5-(tetrahydro-2 - pyranyloxy)-3-undecyn-2-one.

3. 4-(1 - tetrahydro - 2 - pyranyloxy) - cyclohexyl - 3-butyn-2-one.

4. 5,7-dimethyl - 5-(tetrahydro-2-pyranyloxy)-3-octyn-2-one.

5. 5-methyl - 5-(tetrahydro-2-pyranyloxy)-3 - hexyn-2-one.

6. 5-methyl - 5-(tetrahydro - 2 - pyranyloxy)-3-heptyn-2-one.

References Cited in the file of this patent

Jones et al.: J. Am. Chem. Soc., vol. 75, pp. 4048 and 4049 (1953).

Newman et al.: Jr. Org. Chem., vol. 13, pp. 1952–5 (1948).